UNITED STATES PATENT OFFICE.

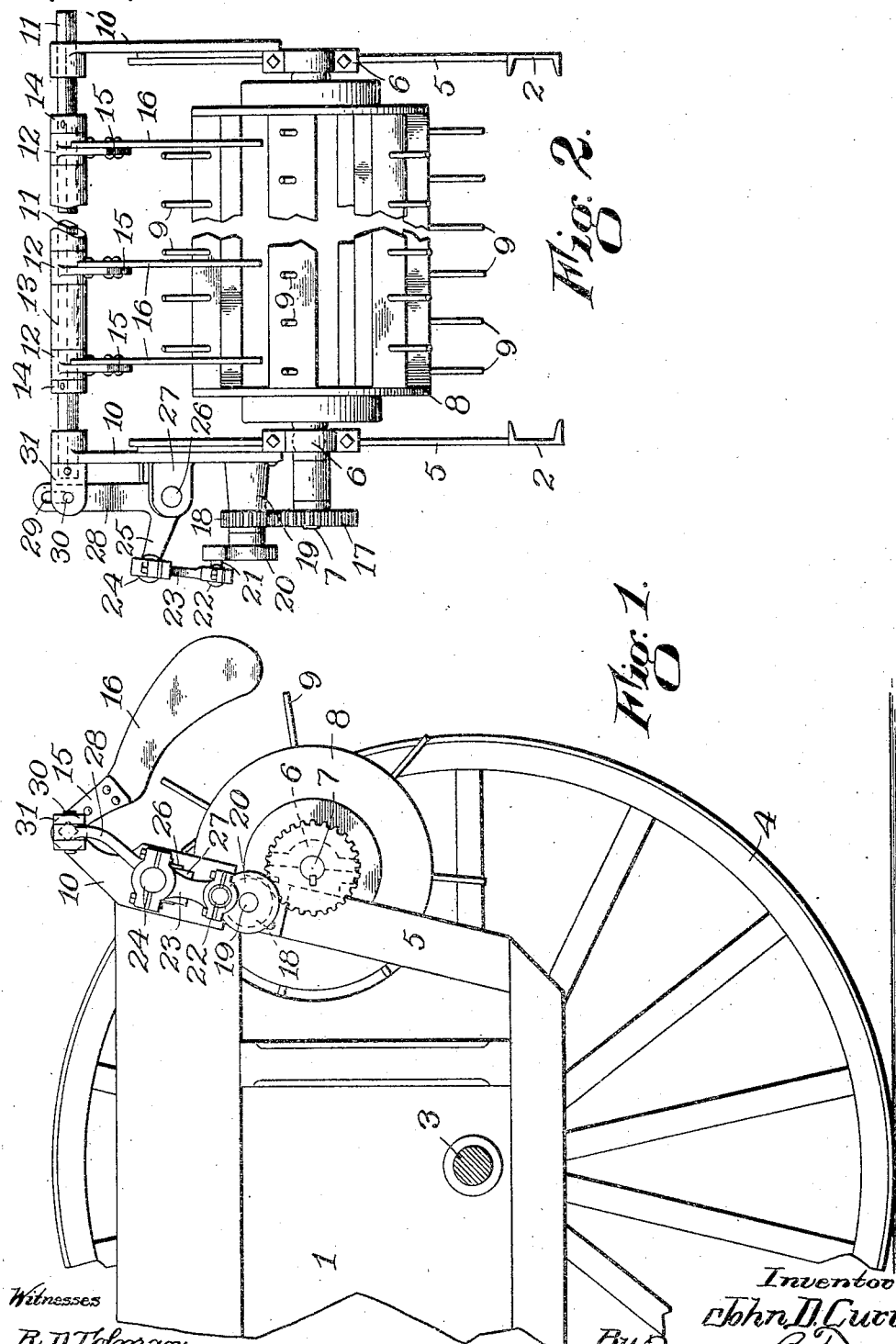

JOHN D. CURTIS, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

1,250,981.  Specification of Letters Patent.  Patented Dec. 25, 1917.

Application filed February 9, 1914. Serial No. 817,685.

*To all whom it may concern:*

Be it known that I, JOHN D. CURTIS, a citizen of the United States, residing at Worcester, in the county of Worcester and Commonwealth of Massachusetts, have invented a new and useful Improvement in Manure-Spreaders, of which the following description, taken in connection with the accompanying drawings, is a specification.

The present invention relates to that class of manure spreaders in which a rapidly revolving beater is employed for the purpose of shredding and scattering manure progressively fed thereto, whereby the ground traversed by the spreader is substantially evenly enriched by the shredded manure thrown out from said beater, and falling by gravity to the ground.

In devices of the character above described, the axial length of the revolving beater determines, approximately, the width of the strip of ground covered with manure by the passage thereover of the spreader, and it is one purpose of the present invention to increase the width of the strip of ground over which the spreader is effective without increasing the axial length of the beater. To this end, the present invention contemplates the provision of auxiliary scattering means, in addition to, and coöperating with, said revolving beater, by means of which a portion of the manure shredded by said beater is deflected from the course imparted to it by said beater, and forcibly thrown out over and beyond the ends of said beater, thereby increasing the efficiency and range of operation of the spreader. Furthermore, it is proposed to so construct the said auxiliary scattering means that the action thereof causes a more thorough and effective disintegration of the manure than would be obtainable with the use of a revolving beater alone.

Other and further advantages will be apparent from the following detailed description taken in connection with the accompanying drawings, in which—

Figure 1 is a view in side elevation of the rear end of a manure spreader embodying my invention, and Fig. 2 is a rear view of a portion of the manure spreader shown in Fig. 1, illustrating the revolving beater and the auxiliary manure scattering mechanism.

Similar reference characters refer to similar parts in both figures.

Referring to the drawings, 1 designates the body of the spreader, carried on longitudinal sills 2, 2 and supported at the rear by an axle 3, having journaled thereon rear wheels 4, one of which is shown in Fig. 1. Carried upon the extreme rear end of each sill 2 is a substantially upright standard 5, upon the rear sides of which are provided journal bearings 6, 6, for the shaft 7 of a revolving beater 8. Said beater 8 is rotated at a high rate of speed by any suitable mechanism, not shown, and upon its periphery is provided with a plurality of rows of spaced radially disposed arms or teeth 9, each row having its arms in staggered relation to the arms of adjacent rows. The mass of manure carried in the body of the spreader is progressively fed to the revolving beater 8 by any suitable mechanism, not shown; the action of the arms 9 on the manure effects a shredding of the mass, the portions torn loose therefrom being forcibly thrown rearwardly of the spreader in lines substantially at right angles to the axis of the beater, and tangential to the periphery thereof.

The uprights 5 have secured thereto extensions 10, 10′ provided with square apertures at their outer ends for the reception of a slidable bar 11, which is square in cross section. Carried by said bar 11 are a number of sleeves 12, alternating with spacing sleeves 13, said sleeves being prevented from turning on said bar by reason of fitting the rectangular surfaces thereof and held from endwise movement thereon by collars 14, 14, secured to the bar and spaced from the extensions 10, 10′ to permit longitudinal reciprocation of said bar in the guideways formed in the ends of said extensions. The sleeves 12 have projecting therefrom arms 15 to which are secured downwardly and rearwardly extending vertical blades 16, the lower edges of which are curved to conform to, and closely approach, the circular paths of the ends of the arms 9 of the beater.

The shaft 7 of the beater is extended outwardly on one side of the spreader and carries on said extension a spur gear 17, which meshes with a pinion 18 loosely mounted on a short shaft 19, projecting outwardly from the adjacent extension 10. Secured to the hub of the pinion 18 is a crank disk 20, having an eccentric crank arm 21 thereon, which is universally connected as at 22 with one end of a link 23. The other end of the link 23 has a universal connection 24 with one arm 25 of a bell crank lever which is pivoted on a pin 26 carried by ears 27 projecting from the extension 10. The other curved arm 28 of said bell crank lever has an elongated slot 29 formed in its end, to receive a pin 30 carried by a collar 31 secured to the end of bar 11 beyond the guideway provided in the end of extension 10.

The rapid rotation of beater 8 effects through the above described mechanism a rapid reciprocation of bar 11, and the blades 16, carried thereby, are rapidly moved back and forth directly in the path of the shredded particles of manure thrown rearwardly by the arms of said beater. The contact of the shredded particles of manure thrown rearwardly by the beater 8 with the sides of the transversely moving blades 16 effects a lateral deflection of a large portion of such particles beyond the ends of the beater, whereby the area over which the spreader of my invention is effective, is greatly in excess of the area over which a spreader having only a rotating beater, is effective. Furthermore, the reciprocating action of the blades materially aids in a more thorough and effective disintegration of the manure, causing the ground traversed by the spreader to be uniformly covered with a more finely-divided product. As the blades are arranged in vertical planes, they strike the lumps of manure broadside as the latter are thrown in a horizontal plane tangential to the periphery of the beater. The blow is imparted by the blades when the lumps are traveling with the greatest force, having just been thrown from the teeth of the rapidly rotating beater.

I claim,

1. In a manure spreader, a revolving toothed beater, a reciprocating bar slidable in bearings parallel with the axis of said beater, and vertical blades rigidly attached to and extending from said bar into the path of manure thrown tangentially from the periphery of said beater.

2. In a manure spreader, a revolving toothed beater journaled in horizontal bearings at the rear of the body of the spreader, a reciprocating bar slidable in bearings parallel with and above the axis of said beater, a series of vertical blades carried by said bar and extending rearwardly and downwardly to intercept a horizontal plane extending tangenially from the periphery of said beater, and means for reciprocating said bar.

3. In a manure spreader, a revolving toothed beater, a reciprocating bar supported above and parallel with the axis of said beater, a series of blades rigidly attached to said bar and arranged in vertical planes at right angles with the axis of the beater, with said bars intercepting a horizontal plane above the axis of said beater tangential to its periphery.

4. In a manure spreader, a revolving toothed beater, a reciprocating bar parallel with the axis of the beater, a series of vertical blades carried by said bar and extending into a horizontal plane tangential to the periphery of the beater, said blades being curved corresponding to the curvature of said beater.

Dated this fourth day of February, 1914.

JOHN D. CURTIS.

Witnesses:
 RUFUS B. FOWLER,
 PENELOPE COMBERBACH.

Copies of this patent may be obtained for five cents each, by addressing the "Commissioner of Patents, Washington, D. C."